P. MUELLER.
FULLER BALL.
APPLICATION FILED AUG. 27, 1919.
1,413,764.
Patented Apr. 25, 1922.
2 SHEETS—SHEET 1.
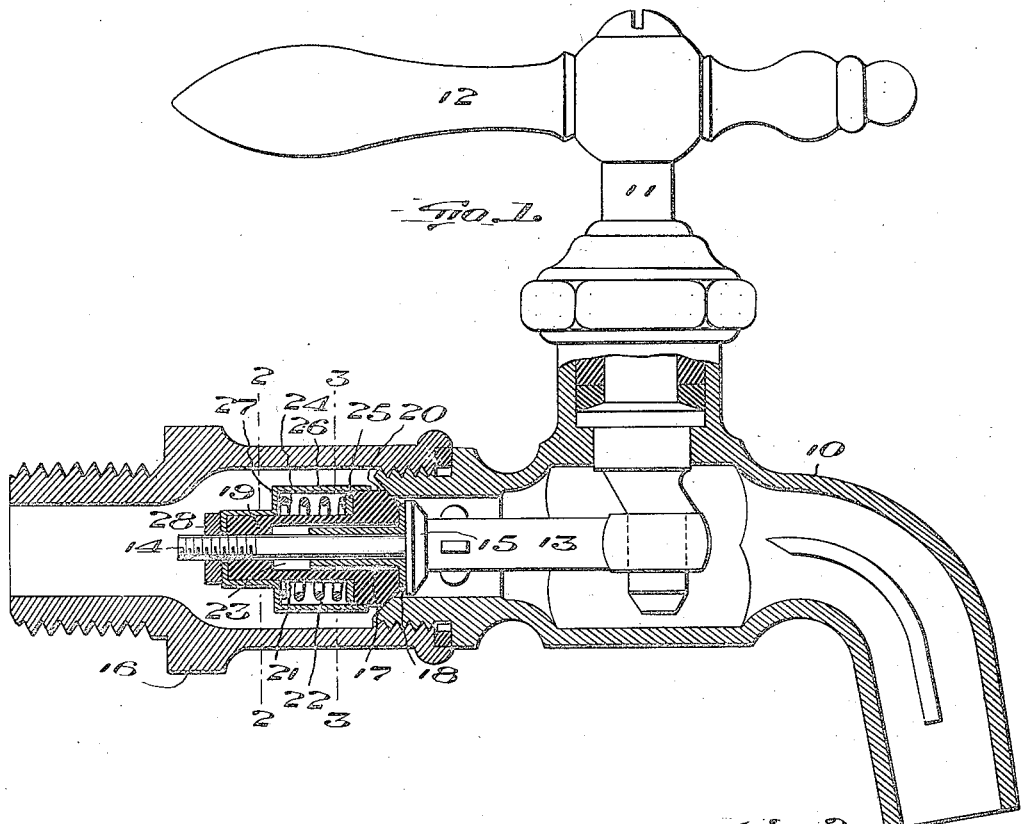
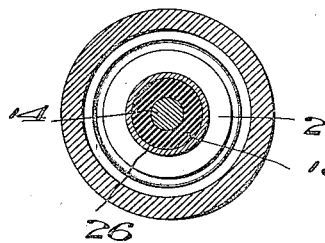
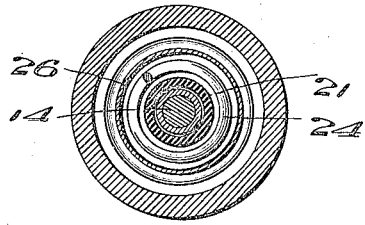
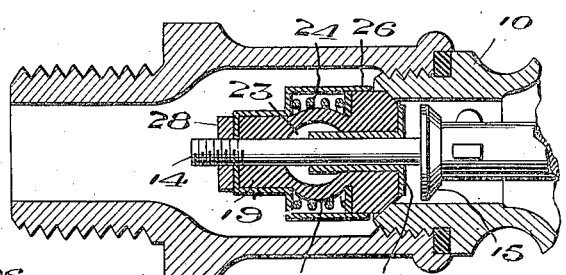
Witnesses
Inventor
Philip Mueller P. MUELLER.
FULLER BALL.
APPLICATION FILED AUG. 27, 1919.
1,413,764.
Patented Apr. 25, 1922.
2 SHEETS—SHEET 2.
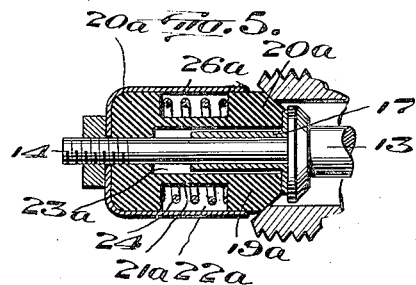
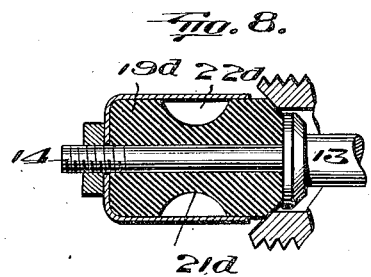
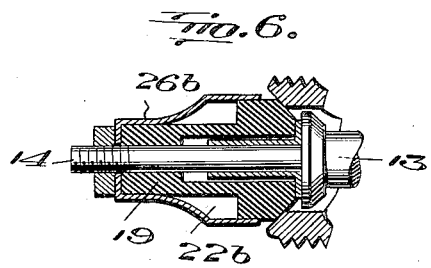
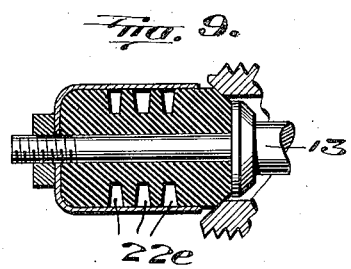
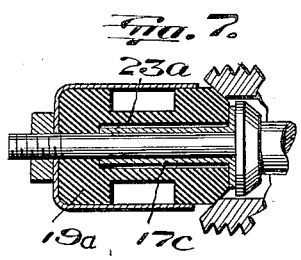
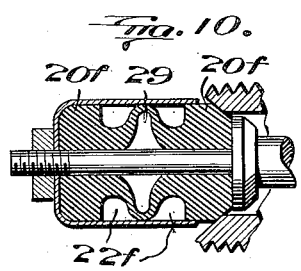
Inventor
Philip Mueller

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

FULLER BALL.

1,413,764. Specification of Letters Patent. Patented Apr. 25, 1922.

Application filed August 27, 1919. Serial No. 320,289.

*To all whom it may concern:*

Be it known that I, PHILIP MUELLER, a citizen of the United States, residing at Decatur, in the county of Macon and State of Illinois, have invented new and useful Improvements in Fuller Balls, of which the following is a specification.

This invention relates to Fuller balls and has as its objects to provide a Fuller ball which may be used for a long period of time without breaking down under the strains and deteriorating influences to which it is subjected when in use.

Further objects of this invention are to so construct the Fuller ball that the strains exerted upon it, when it is brought to its seat, are distributed and the valve seat end of the ball is not mutilated or in any other way seriously damaged; to prevent undue swelling, excessive radial expansion and permanent distortion of the ball; to allow for the proper resiliency of the elastic body, yet maintaining it in such condition that it will prevent leakage thereabout when the faucet to which it is applied is in closed position; to provide a Fuller ball which is efficient in operation and relatively simple in construction, and, generally, to lengthen the term of usefulness of the Fuller ball without materially increasing the cost of manufacturing the same.

The above and other objects of my invention are obtained in the structures described in the following specification and illustrated in the accompanying drawings, and wherein Figure 1 is a sectional view taken longitudinally through a bibb or cock to which one form or embodiment of my improved Fuller ball is applied, the bibb being shown in partially closed position.

Figure 2 is a sectional view taken on the line 2—2, Figure 1.

Figure 3 is a sectional view taken on line 3—3, Figure 1.

Figure 4 is a view similar to Figure 1, the body portion of the cock being omitted, however, and the Fuller ball being shown in totally closed position.

Figure 5 is a longitudinal sectional view of a Fuller ball showing another form of my invention.

Figures 6 to 10, inclusive, are views similar to Figure 5, but show still other embodiments of my invention.

Referring to the drawings wherein like numerals represent like parts, and particularly to Fig. 1, 10 designates a faucet which may be of any suitable construction, that shown in the drawings being by way of illustration only. The faucet, in the present instance, is provided with an eccentric stem 11 having at its upper end a handle 12 and carrying at its lower end a valve stem 13, the outer end 14 of which stem is of reduced diameter, and at the junction between the enlarged and reduced portions of the stem is an integral collar 15. Secured to the shank of the faucet is the usual tail-piece 16 in the enlarged bore of which the valve head is adapted to reciprocate.

It is to be understood that the faucet above described is for illustrative purposes only, and that my said improved Fuller ball may be employed in types of faucets or cocks other than that shown. The valve stem 13 may be reciprocated in any suitable manner, a faucet having an eccentric stem being disclosed as this type is a well-known construction.

Referring to the embodiment of my invention shown in Figures 1 to 4, it will be noted that the reduced end 14 of the valve stem 13 has slidably mounted thereon, a tubular sleeve 17 having an outwardly extending flange 18 adapted to abut against the collar 15 on the stem 13.

19 designates the elastic valve body which in the present embodiment comprises a member having a valve seat end portion 20 of enlarged diameter, and a second portion 21 of less or reduced diameter. Thus the valve body is provided with a relatively thick portion, and a relatively narrow portion, and of course this latter portion will expand or be laterally displaced more readily than the first portion. The space about the reduced portion of the valve body constitutes a circumferential recess 22. The valve body 19 is provided with a through opening, which opening at the end of the reduced portion of the body is substantially of the same diameter as that of the reduced portion 14 of the stem 13, so that it snugly receives the same and thus prevents leakage of fluid through the ball. The opposite end of the opening is of somewhat larger diameter so as to provide an enlarged bore 23 adapted to loosely receive the sleeve 17 and this bore is greater in depth than the length of the sleeve 17, so that the sleeve may move longitudinally therein.

About the exterior of the reduced portion 21 of the elastic valve body 19 and extending for a portion of its length is a coil spring 24 which abuts at one end against a collar or ring 25 positioned against the shoulder formed by reducing the outer end of the elastic valve body.

The end of the elastic valve body opposite its seating end, together with the spring 24 and the ring 25 are enclosed by a ferrule 26, which ferrule has an enlarged portion the internal diameter of which is equal to the external diameter of the enlarged portion 20 of the elastic body, and a reduced portion which is adapted to snugly fit about the outer end of the reduced portion 21 of the elastic valve body. The spring 24 lies within the enlarged portion of the ferrule and abuts at one end against the shoulder 27 of the ferrule and at its other end against the collar 25 so that, when the valve body 19 is foreshortened, the spring is placed under compression. The end of the ferrule opposite to the valve seat end of the valve has a closed wall adapted to abut against the outer end of the elastic valve body 19, this wall being apertured so as to loosely receive the threaded end of the reduced portion 14 of the stem 13. The parts are maintained in position upon the stem by means of a nut 28.

In operation, when the faucet is opened, to the extent that the valve body 19 is spaced from its seat 11, and which position is shown in Figure 1, no pressure is exerted upon the Fuller ball, and in this condition, the valve body assumes its normal shape. When the cock is brought into closed position as shown in Fig. 4, the forward or valve seat end of the elastic body is brought into engagement with the valve seat 11, and the elastic body is placed under compression. As the Fuller ball is secured to the valve stem 13 by means of the nut 28, the ball will tend to foreshorten and due to the pressure exerted expand radially. The enlarged portion 20 of the valve body will be forced against the spring 24 which is of such length that it is placed under compression and thus the spring will take up a part of the force exerted and prevent excessive deformation and permanent distortion of the valve body. The illustration in Fig. 4 is somewhat exaggerated to more clearly bring out the operation of the improved structure. In actual use the foreshortening of the elastic valve body and the radial expansion of the portion 21 would not be so pronounced.

In those cases, where no means is provided for aiding the elastic ball member to retain its normal shape, the ball will expand unduly, and will soon become permanently distorted, so that its seating end becomes uneven and leakage results. In those cases where the ball member is snugly encased in a ferrule, radial expansion of the ball cannot take place so that the valve seat end of the ball must take up the entire strain exerted.

By constructing the Fuller ball in the manner herein described, a portion of the Fuller ball may readily expand radially, this portion comprising that between the reduced portion of the ferrule 26 and the ring 25. The wall of the reduced portion of the valve body 19 being relatively thin, it will tend to expand into the recess 22, but as shown in Figure 4, the spring 24 guards against excessive expansion of the reduced portion of the ball, and, therefore, permanent distortion thereof.

Referring now to the embodiment shown in Figure 5, the elastic member $19^a$ of the Fuller ball comprises a somewhat cylindrical body having its opposite end portions $20^a$ of enlarged and like diameter, and intermediate these portions is a portion $21^a$ of reduced diameter. Within the recess or circumferential groove $22^a$ between the enlarged portions $20^a$, and about the reduced portion $21^a$ is located the spring 24. The sleeve 17 located within the bore $23^a$ is similar in construction to the sleeve shown in Figure 1. The valve body 19 is encircled by a ferrule $26^a$ which is of the same diameter throughout its length.

The Fuller ball shown in Fig. 5 functions in a manner similar to that of the construction shown in Figures 1 to 4. When the ball is brought to its seat the valve seat end of the elastic body $19^a$ is forced outwardly towards the end of the valve stem and the spring 24 is placed under compression. At the same time, the reduced portion $21^a$ of the Fuller ball will expand radially, the extent of expansion being limited by the spring 24. The enlarged end of the Fuller ball opposite the seating end has imparted to it, through the spring 24, some of the pressure exerted against the valve seat end of the elastic valve body.

The embodiment of my invention disclosed in Fig. 6 is somewhat similar to that disclosed in Fig. 1, except that the spring 24 is omitted, and the ferrule $26^b$ is of slightly different shape. In this embodiment, the reduced portion of the valve body 19 expands radially into the recess $22^b$ when the valve is brought to its seat, and thus excess pressure upon the valve seat end of the ball is guarded against.

The embodiment shown in Fig. 7 is similar to that shown in Fig. 5, except that the spring 24 is omitted, and the sleeve $17^c$ is of like length as the depth of the bore $23^a$ of the elastic valve body $19^a$.

Referring now to the embodiment disclosed in Fig. 8, the elastic valve body 19$^d$ comprises a member having a central bore of like diameter throughout its length which is adapted to receive the reduced portion 14 of the stem 13. The sleeve 17 and spring 24 are omitted. The valve body 19$^d$ is provided, intermediate its ends, with a portion 21$^d$ of reduced diameter, and a circumferential recess or groove 22$^d$, this groove being somewhat similar to the groove 22$^a$ shown in Fig. 5, except that it is curved in cross-section.

The Fuller ball construction shown in Figure 9 is similar to that shown in Figure 8, except that a plurality of circumferential grooves 22$^e$ are provided about the elastic valve body 19$^e$.

The construction shown in Fig. 10 is similar to the structure shown in Figs. 8 and 9 in that the sleeve 17 is omitted, and the Fuller ball is provided with enlarged ends 20$^f$ of like diameter. Between the enlarged ends 20$^f$ of the valve body, the walls of the body are bulged outwardly, so as to provide circumferential grooves 22$^f$ and an internal recess 29.

When a faucet to which is applied one of the structures shown in Figs. 8, 9 and 10, is brought into closed position, the elastic valve body will tend to foreshorten and the body will swell outwardly into the circumferential groove or grooves, so that the valve seat end of the elastic valve body is not subjected to excessive pressure.

It will be noted that in each of the embodiments of my invention the elastic valve body is provided with a portion of reduced diameter, so that a recess or circumferential space is obtained into which the material of the ball may be forced.

In the embodiments shown in Figures 1 to 5, the spring 24 is provided so as to take up part of the strain exerted upon the ball and prevent undue expansion of the reduced portion of the valve body.

It is to be understood that my invention is susceptible of various modifications and changes which would be within the spirit of the invention without departing from the scope of the following claims.

What I claim is:—

1. A Fuller ball valve having an elastic ball member provided with a groove which will permit the body to be displaced laterally under pressure.

2. A Fuller ball valve having an elastic ball member provided with a groove in its perimeter which will permit the body to be displaced laterally under pressure.

3. A Fuller ball valve having an elastic ball member provided with a circumferential groove in its perimeter which will permit lateral displacement of the body under pressure.

4. A Fuller ball valve having an elastic ball member provided with a groove which will permit the body to be displaced laterally when placed under compression, and a ferrule about said valve body.

5. A Fuller ball valve having an elastic ball member provided with a groove in its perimeter, and a ferrule about said ball, said groove constituting a recess between the ball and the ferrule which permits lateral displacement of the ball when placed under compression.

6. A Fuller ball valve having an elastic ball member provided with a circumferential groove in its perimeter, and a ferrule about said ball, said groove constituting a space between the ferrule and the walls of the valve body which permits the body to be displaced laterally when placed under compression.

7. A Fuller ball valve having an elastic ball member provided with a valve seat end of enlarged diameter and a portion of reduced diameter, and a ferrule encircling said ball and spaced from the walls of the reduced portion thereof so as to provide a recess which will permit the reduced portion to be displaced laterally when the ball is placed under compression.

8. A Fuller ball valve having an elastic ball member provided with a valve seat end and a groove in its perimeter located rearwardly of said valve seat end, and a ferrule about the portion of said body provided with said groove so as to provide a recess which will permit the ball to be displaced laterally when placed under compression.

9. A Fuller ball valve having an elastic ball member with a portion of reduced diameter which is adapted to be displaced when the ball is placed under compression, and means for relieving the reduced portion of a part of the strain which would otherwise be placed upon it when the ball is placed under compression.

10. A Fuller ball valve having an elastic ball member provided with a recess, and means in said recess for absorbing a portion of the strain to which the ball is subjected when placed under compression.

11. A Fuller ball having a groove in its perimeter, and a spring within said groove adapted to absorb a portion of the strain exerted upon the ball when placed under compression.

12. A Fuller ball having a circumferential groove and a coil spring within said groove adapted to absorb a portion of the strain placed upon the ball when put under compression.

13. A Fuller ball having an elastic valve body provided with a valve seat end of enlarged diameter, and a portion of reduced diameter, a ferrule about said valve, and a spring between the ferrule and about the reduced portion of said ball.

14. A Fuller ball having an elastic valve body provided with a valve seat end of enlarged diameter and a portion of reduced diameter, a ferrule about said valve, a spring between the ferrule and about the reduced portion of said ball, and an abutment adjacent the end of the body opposite to the valve seat end, said spring being adapted to engage at its opposite ends against said abutment and valve seat end.

15. In a Fuller ball, a valve body having an enlarged valve seat end and having its opposite end of enlarged diameter, a spring between the enlarged portions of said Fuller ball, and a ferrule about said body.

16. In combination, a valve stem, a sleeve upon said stem, and a Fuller ball upon said stem having an internal bore adapted to receive said sleeve and a groove about the periphery of said Fuller ball which permits lateral displacement of the reduced portion of the ball when the ball is brought to its seat.

17. In combination, a valve stem, a sleeve upon said stem, an elastic valve body having an internal bore of greater length than said sleeve and adapted to receive the same, a portion of the walls of said valve body being of reduced thickness so as to provide a recess which will permit the ball to be laterally displaced when placed under compression, and a ferrule about said ball.

18. In combination, a valve stem, a sleeve on said stem, a valve body having an enlarged bore of greater length than said sleeve and adapted to receive the same, said body having a circumferential groove intermediate its ends, a spring in said groove adapted to engage at its opposite ends against the enlarged ends of said body, and a ferrule about said body.

19. A Fuller ball having an elastic ball member provided with a relatively thin collapsible section between its ends which will be laterally displaced under pressure when the ball member is forced to its seat.

20. A Fuller ball having an elastic ball member provided with a relatively thin collapsible section between its ends which will be circumferentially displaced under pressure when the ball member is forced to its seat.

21. A Fuller ball having an elastic ball member provided with a relatively thin collapsible section between its ends which will be laterally and circumferentially displaced under pressure when the ball member is forced to its seat.

In testimony whereof I have hereunto set my hand.

PHILIP MUELLER.